United States Patent [19]
Gukkenberger et al.

[11] Patent Number: 4,821,405
[45] Date of Patent: Apr. 18, 1989

[54] METHOD OF SECURING A VIDEO MAGNETIC HEAD

[76] Inventors: Horst Gukkenberger, Weiherhofer Hauptstr.81, D-8502 Zirndorf; Karl Eberle, Blütenstr. 15, D-8501 Cadolzburg; Klaus J. Köpnick, Königsbergerstr.42, D-8510 Fürth, all of Fed. Rep. of Germany

[21] Appl. No.: 80,049

[22] Filed: Jul. 31, 1987

[30] Foreign Application Priority Data

Aug. 2, 1986 [DE] Fed. Rep. of Germany ....... 3626307

[51] Int. Cl.$^4$ ............................................. G11B 5/127
[52] U.S. Cl. ...................................... 29/603; 29/840; 249/85.12; 65/43
[58] Field of Search ...................... 29/603, 832, 840; 360/104, 107, 110; 219/85 BA, 85 BM; 65/45

[56] References Cited

U.S. PATENT DOCUMENTS

| 2,996,401 | 8/1961 | Welch et al. | 65/43 |
| 3,375,575 | 4/1968 | Visser et al. | 65/43 |
| 4,240,121 | 12/1980 | Prochnow | 360/123 |

FOREIGN PATENT DOCUMENTS

| 199431 | 11/1983 | Japan | 360/104 |
| 63058 | 4/1984 | Japan . | |
| 45910 | 3/1985 | Japan | 29/603 |
| 122906 | 6/1986 | Japan | 29/603 |

Primary Examiner—P. W. Echols
Attorney, Agent, or Firm—F. Brice Faller

[57] ABSTRACT

Magnetic head (1) has two connected core halves (4, 5) having recesses (2) at a plurality of areas, filled up with glass solder (2'). After securing the magnetic head to the head disc 3 in a predetermined position, the glass solder in the recesses is melted and the melting glass solder connects the magnetic head to the head disc.

11 Claims, 1 Drawing Sheet

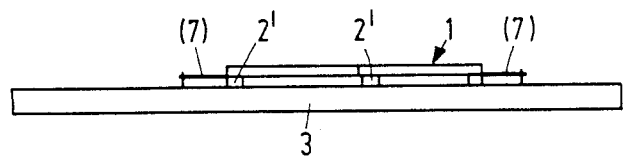
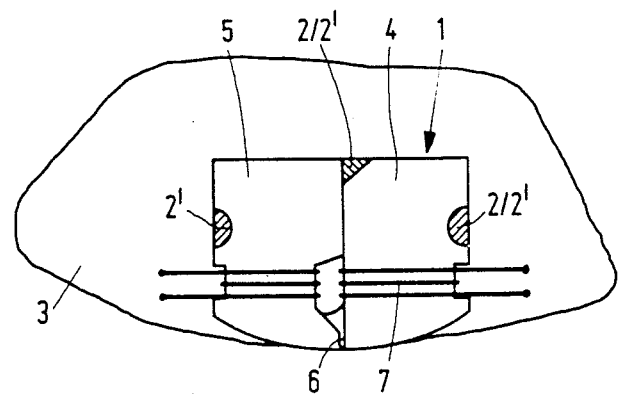
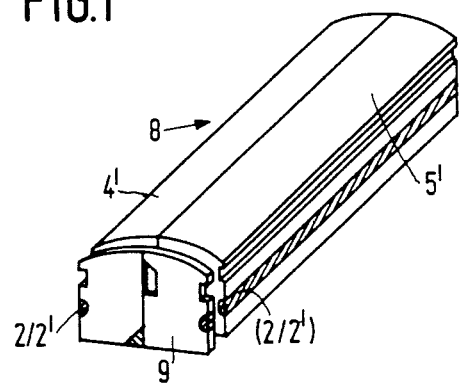
FIG.2
FIG.1
FIG.3

METHOD OF SECURING A VIDEO MAGNETIC HEAD

BACKGROUND OF THE INVENTION

This invention relates to a method of securing a video magnetic head to a head disc of a video magnetic tape apparatus. The magnetic head comprises two connected core halves having a nonmagnetic gap, with at least one coil wound around a core half and in which the two core halves are separated from a preformed core block which is composed of two core block halves.

It is known to connect the video magnetic heads in a video magnetic tape apparatus to a mounting plate by means of an adhesive. This unit is screwed or welded or adhered by means of the mounting plate onto the head disc which is rotatably arranged in the head drum of a video apparatus. The video head can then be adjusted via the mounting plate by inserting an adjusting screw or by bending the mounting plate. Such a labour-intensive mounting and adjusting process for providing the video magnetic head on a head disc of a video apparatus is costly and disadvantageous because a change in the adjustment of the head is possible due to thermal influence of the parts manufactured from different materials.

SUMMARY OF THE INVENTION

It is an object of the invention to provide the possibility of a simpler and less costly mounting method ensuring that the predetermined position of a video head on a head disc remains unchanged, for example in the case of temperature fluctuations.

The connected core halves have recesses at least at two, preferably three areas, and the recesses are filled up with meltable solder, preferably glass solder The magnetic head is soldered in a predetermined position onto the head disc by means of melting the solder.

BRIEF DESCRIPTION OF THE DRAWING

FIG. 1 is a plan view of a video magnetic head which is directly secured to a head disc of a video magnetic tape apparatus, FIG. 2 is a front view of FIG. 1 and FIG. 3 is a perspective view of a core block from which the connected core halves of the magnetic head are separated.

DETAILED DESCRIPTION OF THE PREFERRED EMBODIMENT

FIG. 1 shows that the video magnetic head 1 has recesses 2 at three areas via which the magnetic head is secured to a head disc 3. The recesses 2 accommodate a sealed-in glass solder 2' which is heated and partially flows out of the recesses whereby the magnetic head 1 and the head disc 3 are soldered together. The video magnetic head 1 essentially comprises two core halves 4 and 5 which are connected, for example by means of glass solder while forming a non-magnetic gap 6. By inserting wire windings in the form of a coil 7 in a core aperture provided for this purpose, the magnetic head is capable of functioning.

FIG. 2 shows the position of the height of the magnetic head 1 with respect to the head disc 3. The desired space between the magnetic head and the head disc is formed in that the glass solder 2' partially flows out of the recesses 2 which are present in the core halves. During soldering the magnetic head to the head disc the predetermined space between the magnetic head 1 and the head disc 3 is ensured by spacers on a measuring device.

FIG. 3 shows a core block 8 which is formed from the two connected core block halves 4' and 5' and from which the separate connected core block halves are sliced as a complete magnetic core 9, for example by means of abrasive cutting. The core block accommodates groove-shaped recesses filled up with glass solder. The recesses may have any arbitrary shape and only the enclosed glass solder volume is important in this case. For the purpose of a better bonding of the glass solder to the head disc it is advantageous that at least those areas at which the glass solder from the recesses of the magnetic head reaches the head disc are provided with a bonding layer. The bonding layer is preferably of a metallic type and may be provided, for example by means of electroplating or by another method. The bonding layer may also be ceramic. Whether metallic or ceramic, the bonding layer may be provided by means of electrodeposition or vapor deposition or sputtering on the surface of the disc facing the magnetic head, preferably only at the area of securing the head. The solder may be melted by a laser or electron beam to achieve bonding.

What is claimed is:

1. A method of manufacturing a video magnetic tape apparatus comprising a head disc having a video magnetic head secured thereto, said method comprising the following steps:

connecting two core block halves to form a core block having a non-magnetic gap between said halves, providing said core block with an elongate recess in each respective core block half, each recess facing away from the core block half of the other recess, said recesses lying on opposite sides of said block, said recesses paralleling said gap, filling said recesses with solder, separating an individual head from the block, placing the head in a predetermined position on the disc, and soldering the head to the disc by melting the solder in the recesses.

2. A method as in claim 1 wherein an additional elongate recess is provided in said head opposite said gap and substantially parallel thereto, said elongate recess likewise being filled with solder.

3. A method as in claim 1 wherein said solder is melted by a laser beam.

4. A method as in claim 1 wherein said solder is melted by an electron beam.

5. A method as in claim 1 wherein a bonding layer is provided on said disc in the area to which said head is secured.

6. A method as in claim 5 wherein said bonding layer is ceramic.

7. A method as in claim 5 wherein said bonding layer is metallic.

8. A method as in claim 5 wherein said bonding layer is provided by means of electro-deposition.

9. A method as in claim 5 wherein said bonding layer is provided by means of vapor deposition.

10. A method as in claim 5 wherein said bonding layer is provided by means of sputtering.

11. A method of manufacturing a video magnetic tape apparatus comprising a head disc having a video magnetic head secured thereto, said method comprising the following steps:
- connecting two core halves to form a head having a nonmagnetic gap between said halves,
- providing the head with a recess in each respective core half, each recess facing away from the core half of the other recess, said recesses lying on opposite sides of the head,
- filing said recesses with solder,
- placing the head in a predetermined position on the disc, and
- soldering the head to the disc by melting the solder in the recesses.

* * * * *